E2-314
7/21/87 OR RE 32,461

United States Patent [19]
Di Peri

[11] E Patent Number: Re. 32,461
[45] Reissued Date of Patent: Jul. 21, 1987

[54] MODULAR DRY-AIR EVAPORATIVE COOLER

[76] Inventor: Leonard J. Di Peri, 18325 Lahey St., Northridge, Calif. 91326

[21] Appl. No.: 472,225

[22] Filed: Dec. 15, 1982

Related U.S. Patent Documents

Reissue of:
[64] Patent No.: 3,877,244
Issued: Apr. 15, 1975
Appl. No.: 368,756
Filed: Jun. 11, 1973

U.S. Applications:
[63] Continuation of Ser. No. 183,107, Sep. 2, 1980, abandoned.

[51] Int. Cl.[4] ..... F28D 5/00
[52] U.S. Cl. ..... 62/314; 62/311; 165/180
[58] Field of Search ..... 62/311, 314, 316; 165/180

[56] References Cited

U.S. PATENT DOCUMENTS

| | | | |
|---|---|---|---|
| 1,428,661 | 9/1922 | Richardson . | |
| 1,715,753 | 6/1929 | Hardy | 62/314 |
| 2,074,642 | 3/1937 | Coverston | 62/314 |
| 2,150,514 | 3/1939 | McInnerney | 62/314 X |
| 2,165,979 | 7/1939 | Nicholson | 62/311 |
| 2,218,407 | 10/1940 | Meyerhoefer | 62/314 |
| 2,259,541 | 10/1941 | Ballard | 62/314 |
| 2,725,729 | 12/1955 | Mills | 62/314 |
| 3,214,936 | 11/1965 | Di Peri | 62/314 |
| 3,363,680 | 1/1968 | Baker | 165/180 |
| 3,435,893 | 4/1969 | Withers | 165/180 |
| 3,438,432 | 4/1969 | Wetch et al. | 165/180 |
| 3,718,008 | 2/1973 | Zusmanovich | 62/314 X |

FOREIGN PATENT DOCUMENTS 961103 5/1950 France .

*Primary Examiner*—Lloyd L. King
*Attorney, Agent, or Firm*—Kendrick, Netter & Bennett

[57] ABSTRACT

Air conditioning apparatus for the sensible cooling of useable air by the evaporative process at a cost of operation substantially lower than that of mechanical refrigeration of the same capabilities, and advantageously comprised of modular evaporator and blower units and multiple stages thereof with the use of substantially permanent inexpensive plastic materials conducive to the efficient absorption of heat between separate columns of air, one column subject to the evaporative cooling process with no energy change, and the other column subject to the sensible cooling process with a subtraction of energy from the useable air.

31 Claims, 9 Drawing Figures

MODULAR DRY-AIR EVAPORATIVE COOLER

Matter enclosed in heavy brackets [ ] appears in the original patent but forms no part of this reissue specification; matter printed in italics indicates the additions made by reissue.

BACKGROUND

*This application is a continuation of Ser. No. 183,107 filed Sept. 2, 1980, now abandoned, which is for Reissue of U.S. Pat. No. 3,877,244 granted Apr. 15, 1975 based on Ser. No. 368,756 filed June 11, 1973.*

Reference is made to my U.S. Pat. No. 3,214,936 entitled DRY-AIR EVAPORATIVE COOLER issued Nov. 2, 1965 wherein there is a separation of air into two columns, one column subject to evaporation and the other an isolated column of useful air subject to sensible cooling. The unit construction and materials employed in the fabrication of said patented cooler has limited use and is not the least costly. As to use, said patented cooler and others of the prior art are each of a determined capacity and require specified design for specific installations. And as to materials of construction, they have been fabricated of metals, reference being made to the heat transfer tubes which are presumably metallic for efficient heat transfer. However, as will be hereinafter disclosed, the presumptive use of metals of high thermal conductivity is not necessarily required in heat transfer means of the type under consideration; and on the contrary it has been discovered that efficient evaporative modules with sensible air passages are advantageously fabricated of plastic materials which have lower thermal conductivity as compared, for instance, with aluminum or copper. Therefore and in accordance with this invention, I provide modular components for the construction of air cooler installations to specification as circumstances require, and of durable inexpensive materials. With the present invention, there is economy in both installation and operation, while satisfying the temperature drop requirements as desired.

The construction and installation of prior art evaporate coolers has been made according to specification requirements, with the cooling capacity or cubic foot per minute capacity in mind. Also, with ordinary simple evaporative units (not compound) the temperature drop is not entirely predictable and not altogether controllable. On the contrary, a wide range of predicted controllability is aforded with mechanical refrigeration, but at great expense both in high installation costs and high operation costs. In fact, there is such a vast difference in the normal capabilities of evaporative cooling as compared with mechanical refrigeration cooling, that evaporative cooling is seldom if ever considered for use where precisely controlled high temperature drop with absolute humidity is a requirement. However, with the present invention, predictably high temperature drop is controlled in a dry-air evaporative cooler, utilizing separated columns of evaporative cooled air and sensible cooled air passing separately through modular cores with cooling compounded by utilizing multiple stages. As will be described, a portion of the sensibly cooled air from one state is directed through the evaporative chamber of another stage that sensibly cools the remaining portion of air from said one stage, with an efficient and predictable temperature drop in each instance. The number of stages employed is determinative of the total temperature drop, as circumstances require.

The economical fabrication of heat exchanger cores has been a problem in the design of condensers and the like, and where high pressures are employed the tubes extending through fluid handling chambers must be pressure sealed at opposite headers. However, evaporative coolers (not so with mechanical refrigerators) deal with lower pressures wherein it is feasible to employ the press fitting together of plastic and/or elastomeric parts and elements. It is to this end, therefore, that it is an object of this invention to employ a core structure fabricated of inexpensive plastic materials that are conducive to cleanliness and which are not adversely restrictive to the efficient heat transfer.

It is also an object of this invention to provide compatible evaporator and blower modules that are adapted to be cooperatively combined for the movement of separated columns of evaporative and sensible cooled air. Firstly, it is an evaporative module that is provided with a heat transfer core through which the two columns of air pass in directions relative or normal to each other. Secondly, it is a blower module that is provided with air pump means which transports the air on a single axis therefrom. A characteristic feature of the modules is their cubic configurations, preferably square, and the total use of space within the confines of the side walls thereof.

It is still another object of this invention to provide the efficient heat transfer between two columns of air and especially between a column of evaporatively cooled air and a column of sensibly cooled air. It is the unobvious effect of efficient heat absorption from the evaporative process when employing tubes of low heat transfer capability through which sensibly cooled air is passed. Since the most restrictive heat transfer rate is that into the sensibly cooled air within the tube, the less restrictive heat transfer rates through the tube core and between the wetted exterior of the tubes and evaporative air are unobviously non-restrictive. Therefore, it is in fact feasible to employ inexpensive plastic tubes of relatively low thermal conductivity as the heat exchange tubes of the cores as they are hereinafter described.

DRAWINGS

The various objects and features of this invention will be fully understood from the following detailed description of the typical preferred form and application thereof, throughout which description reference is made to the accompanying drawings, in which.

PREFERRED EMBODIMENT

The phenomenon of "evaporative" cooling is a well known effect, in which process decrease in energy as a result of air temperature decrease is regained in the form of moisture; the net result being no change in energy. However, in a "sensible" cooling process there is a change in energy (Enthalphy) by not admitting moisture; the net result being a subtraction of energy from the air. The obvious disadvantage of ordinary evaporative cooling is the addition of moisture to the useful air, whereas the advantage of sensible cooling is that there is no change in absolute humidity during the cooling process of useful air. Reference is made to mechanical refrigeration means normally employed in sensible cooling processes, and all of which is to be compared with the dry-air evaporative cooler which is the subject of said U.S. Pat. No. 3,214,936 where there is a separation of air into refrigerated air subject to evaporation of water and useful air in which there is no humidity change, and wherein conventional construction and materials are employed.

In accordance with the present invention it is the dry-air evaporative principle that is employed, but with improvements relating to efficiency coupled with economy, and to universal applicability with controlled output of useful air. Efficiency and economy is realized by fabrication of inexpensive but effective materials, and controlled applicability is realized by the cooperation of modules combined as may be required. It is the volume of air to be processed which varies in requirement with each installation and which is adapted to by the concept herein disclosed.

Figure 6:
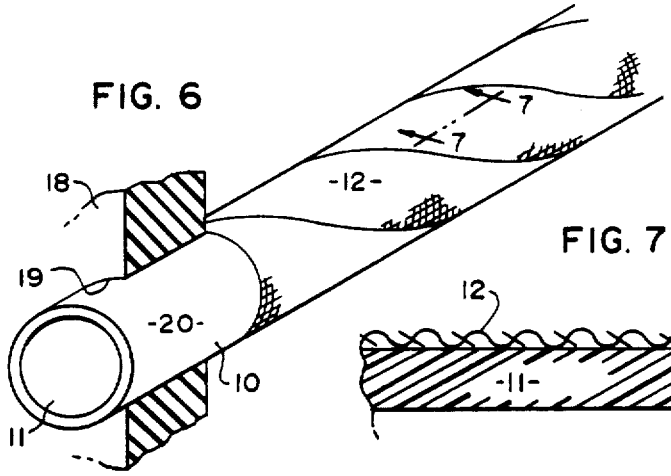
FIG. 6 is a perspective view of one of the tubes which characterizes the invention.
Figure 7:
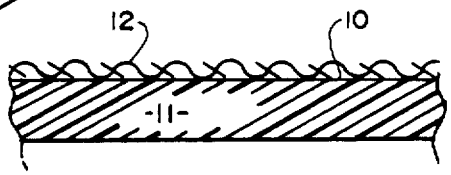
FIG. 7 is an enlarged fragmentary sectional view taken as indicated by line 7—7 on FIG. 6.
Figure 8:
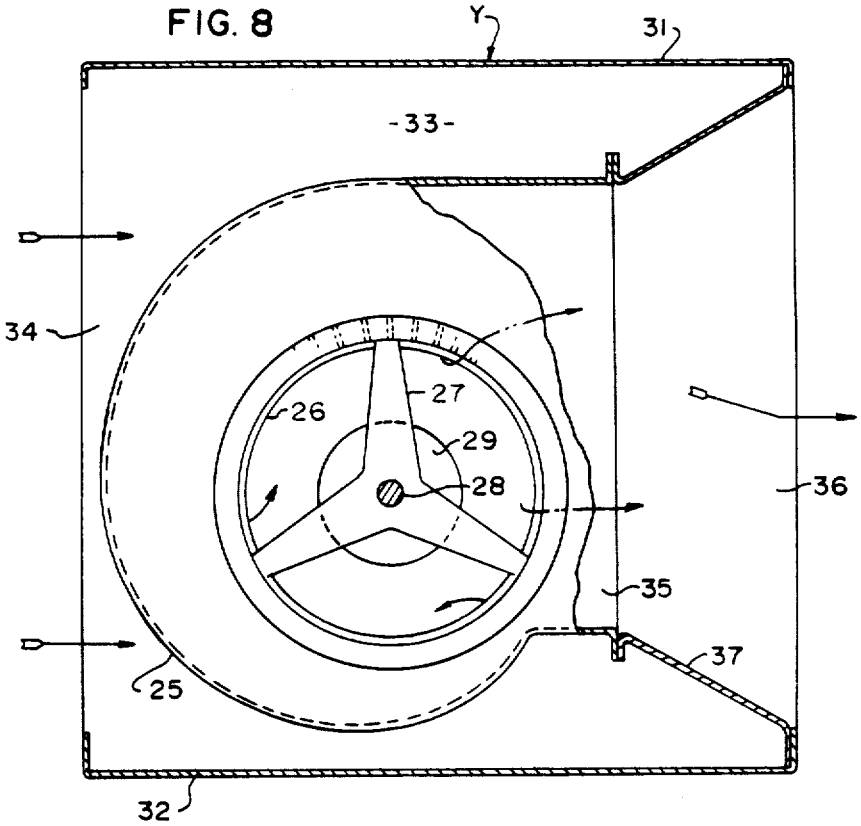
FIG. 8 is an elevational sectional view of the blower module taken as indicated by line 8—8 on FIG. 3.

Reference is made to Disclosure Document No. 014607, filed Nov. 6, 1972, and to FIGS. 6 and 7 of the drawings herein, wherein heat transfer tube 10 of plastic material are advantageously employed. It is the unobvious utility of material having low thermal conductivity as related to that of the evaporative medium such as water, which nevertheless produces this efficient and practical sensible cooling system employing the evaporative cooling principle in the primary cooling process.

The heat transfer tube 10 is a plastic evaporative cooler element comprising a heat conductive wall 11, a material such as polyvinylchloride known as PVC, with one side thereof in contact with the evaporative medium, such as water, and with the other side thereof in contact with the fluid to be cooled, such as the sensible cooled useful air. It is the characteristic of this invention that two columns of fluid are separated by the heat conductive wall 11 having one side to receive the evaporative medium and give up heat and the other side to receive or take up heat. The heat conductive wall can be a plate or the like, in lieu of a tube, and the evaporative outside is surfaced as for example with gauze 12 as best illustrated in FIG. 7 of the drawings. The said other inside has interfacial contact with the air from which heat is sensibly absorbed. It has been discovered that the use of highly conductive and expensive materials in the fabrication of the heat transfer wall 11 is quite unnecessary. In other words, the use of metals such as copper and aluminum in no way enhances the operation of the heat exchanger wall made thereof when employed in an evaporative cooler of the type under consideration where the heat conductivity differential at the water to material interface is roughly a ratio of 450 to 1. Consider therefore, the following:

| THERMAL CONDUCTIVITY OF ELEMENTS | | |
|---|---|---|
| Aluminum | 135.000 | BTU/HR/Sq Ft/°F/Ft |
| Water | .330 | " |
| Air | .160 | " |
| Water Vapor | .137 | " |
| Polyvinylchloride (PVC) | .100 | " |

Operation of a conventional cooler with all aluminum tubing wrapped with gauze moistened with water; will produce a 10° to 15° F. temperature drop in a 86° day, with a temperature drop of useful air of 0.4 to 0.5 of the difference between the inlet and outlet dry-bulb temperatures. Operation of the same cooler with plastic tube made according to this invention of ¾ inch 1/16 inch wall polyvinylchloride (PVC) irrigation pipe also wrapped with gauze and moistened with water produced the same 10° to 15° temperature drop and same 0.4 to 0.5 difference between the inlet and outlet dry-bulb temperatures.

Aluminum tubing is costly, while polyvinylchloride (PVC) plastic tube is presently four times less expensive. The comparison with copper tubing is far more favorable. Consequently, the use of pipe or tubing made of polyvinylchloride (PVC) plastic, now readily available, presents new dimensions to the cost structure and potential marketability or usefulness for this plastic fabrication concept.

By way of analogy the following explains the phenomenon employed to advantage herein: Consider the heat flow rate from air inside of a tube, through the tube and then through a film of water and to the evaporative water-air interface. This is roughly analogous to a series of flow controlling valves; for example, wherein the first valve is a quarter inch valve, the second is a ten inch valve and the third is a one inch valve. The flow through the quarter inch valve is at a maximum while the flow through the other two valves hardly contributes to the resistance. With this analogy in mind, substitute valves of thermal conductivity for the flow resistance of each valve given as an example above and it can be readily concluded that the choke in the heat transfer rate is from the air inside of the tube, and this is the controlling factor. Therefore, a superior heat conductivity of the tube is ridiculous and unnecessary.

Figure 1:
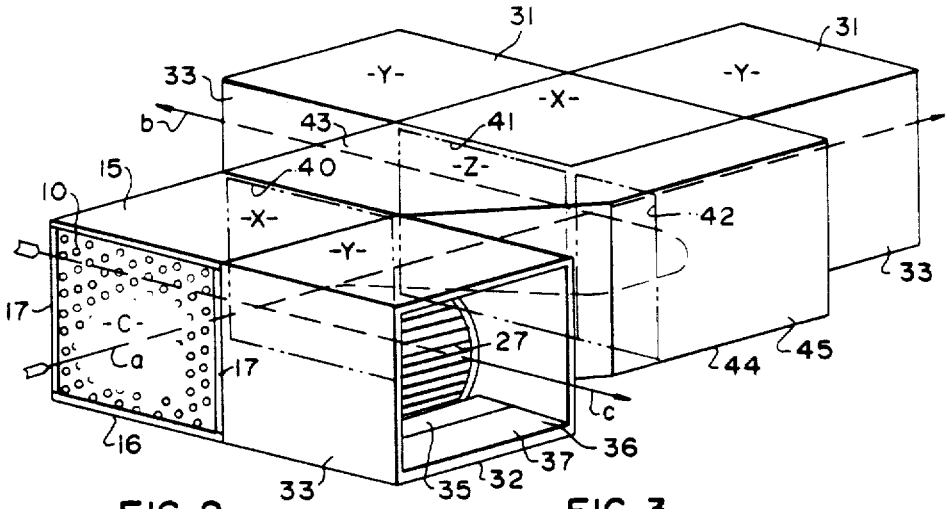
FIG. 1 is a perspective view of a typical arrangement of components comprising the cooperative combination of evaporator and blower modules joined by a diffuser.
Figure 2:
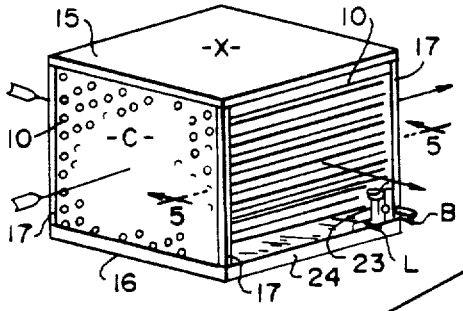
FIG. 2 is a perspective view of one of the evaporative modules shown in FIG. 1.
Figure 3:
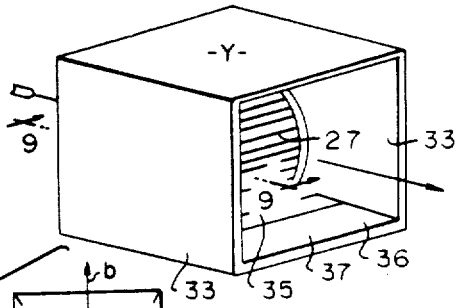
FIG. 3 is a perspective view of one of the blower modules shown in FIG. 1.
Figure 4:
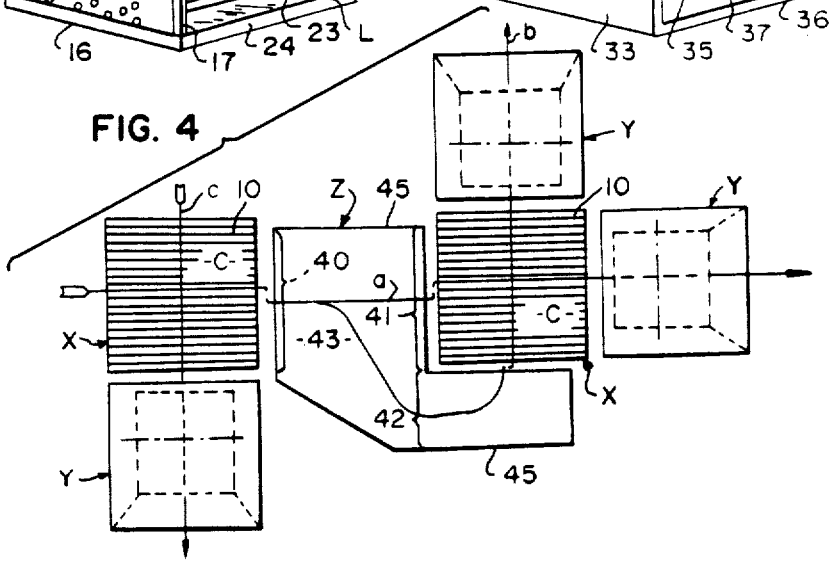
FIG. 4 is an exploded diagram of the modules arranged as shown in FIG. 1 and separated in order to illustrate their individuality.
Figure 9:
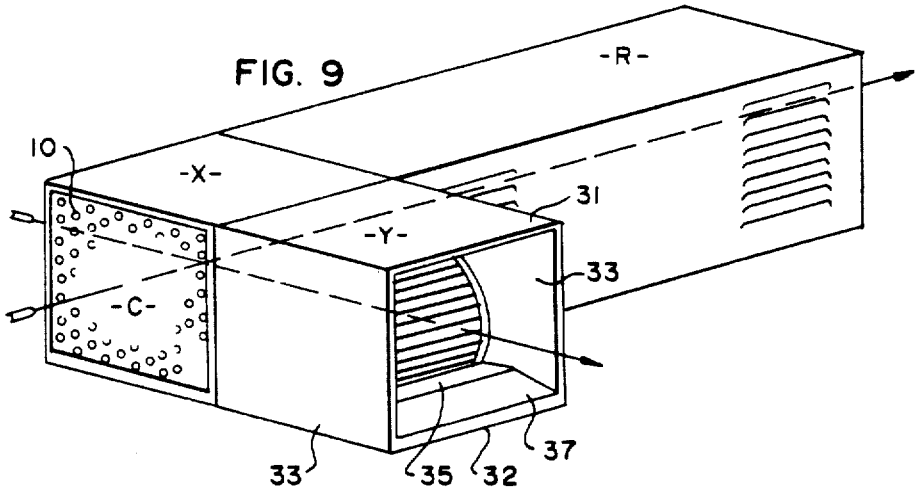
FIG. 9 is a perspective view similar to FIG. 1 and illustrates a second embodiment of the invention.

Referring now to the modules as they are illustrated individually in FIGS. 2 and 3 of the drawings, there is a dry-air evaporative module X and a blower module Y, the two of which are employed as shown in FIGS. 1 and 9; in FIG. 1 as components of a multi-stage cooler, and in FIG. 9 as components of a pre-cooler for a mechanical refrigeration unit R. The modules X and Y are adapted to be joined one to the other for flow of air therethrough, and they are adapted to be coupled together by a plenum unit Z. The modules X and Y are three dimensional squares, and the plenum unit Z is dimensioned accordingly to receive and transport air between the modules coextensively of the cross sections thereof and from the open sides and/or open ends. Thus, the modules X and Y are adapted to be placed and/or stacked side by side, end to end, and top to bottom, dependent upon the augmentation required in order to achieve the air delivery capacity desired.

Figure 5:
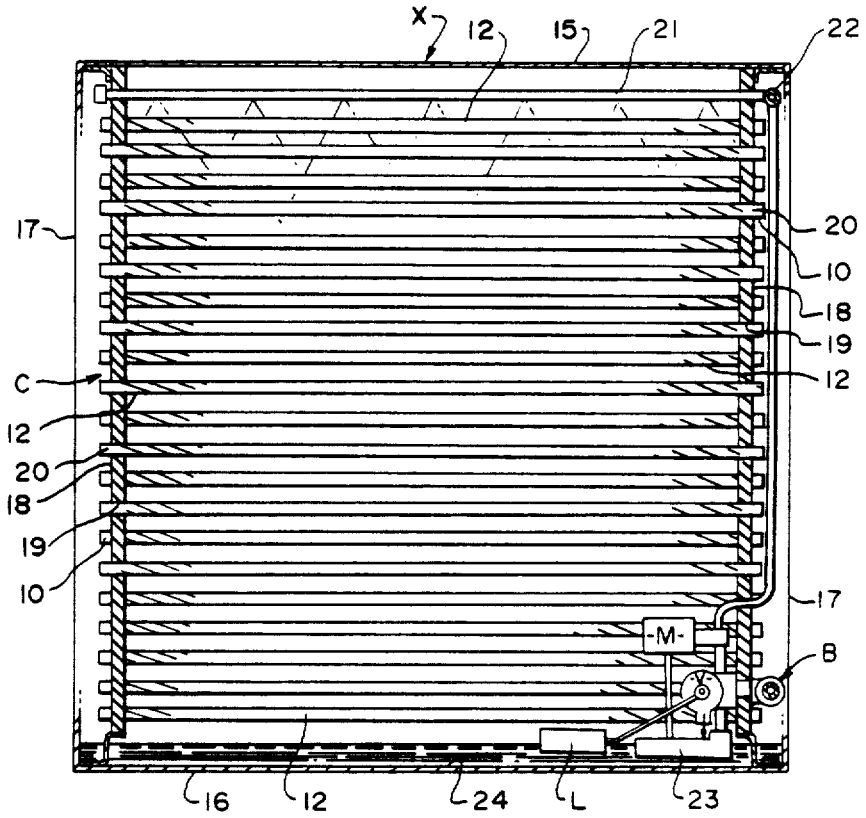
FIG. 5 is an elevational sectional view of the evaporator module taken as indicated by line 5—5 on FIG. 2.

The evaporator module X involves a dry-air evaporative cooler C that fully occupies the volumetric space between top and bottom panels 15 and 16, and in practice there are corner legs 17 that join the panels together in spaced parallel planes for receiving and capturing the core C in working position therebetween. As best illustrated in FIG. 5, the dry-air evaporative cooler core C involves a multiplicity of the tubes 10 hereinabove described that extend between headers 18 in which they are supportably sealed. The headers 18 are identical panels perforated with openings 19 into which the opposite end portion 20 of the tubes 10 are pressed. The headers 18 are square panels of deformible material having top, bottom and opposite side edges compressed within the confines of the panels 15 and 16 and opposite side legs 17 when the core is positioned. Accordingly, the core headers are made of a resiliently compressible plastic or elastomeric material through which the tubes 10 frictionally project with the compression fit assured by the compressed confinement within the panels and legs. In practice, the on-center spacing of tubes 10, vertically as well as horizontally, is approximately two diameters; in which case there is substantial diagonal clearance between tubes for the exterior evaporative process when made damp by the application of water thereover. Characteristically therefore, the dry-air evaporator module X comprises closed top and bottom panels, and open sides and open ends through which separate columns of air are free to be transported. The primary cooling process involves evaporative cooling over the exterior of the tubes 10 by air flowing transversely over said tubes; and the secondary cooling process involves sensible cooling within the interior of the tubes 10 by air flowing longitudinally through said tubes.

Liquid distributing means B is provided to either wet the air or to wet the tubes and which can vary as circumstances require. As shown, the means B involves a liquid carrying conduit 21 disposed above each vertical arrangement of tubes 10. The conduits 21 are joined by a manifold 22 and they are perforated so as to discharge downwardly onto the vertical arrangements of tubes. As shown, there is a motor driven pump 23 that recirculates water from a pan or sump 24 formed of the bottom panel 16, and there is a water level controlled water supply means L to maintain water at the desired level in said pan. With this arrangement the exterior of the evaporative tubes 10 are kept constantly wetted.

The blower module Y involves an air pump means P of any suitable type and preferably a centrifugal fan comprising a blower scroll 25 with opposite end openings 26 between which a barrel type blower wheel 27 is disposed on a transverse horizontal shaft 28 about which the rotor of a drive motor 29 driveably revolves said wheel. It is to be understood that various blower and drive arrangements can be employed, including axial flow of fans; any of which will transport air longitudinally through the blower module Y which forms an elongate tunnel having top and bottom panels 31 and 32 and opposite side panels 33 also. In practice, when employing a centrifugal blower having a scroll 25, the intake end 34 of the module is entirely open into the interior chamber thereof, while the discharge opening 35 of the scroll is substantially smaller in cross section than the outlet end 36 of the module; in which case a divergent passage member 37 couples said discharge opening with said outlet end. Thus, the air delivered by the blower module Y is blown from the entire cross sectional area thereof defined by the panels 31, 32 and 33.

The evaporator module X is by itself ineffective to deliver useful air and requires air transport means for relative transverse and longitudinal air flow therethrough. The advantage of the modular construction is for adaption to specifications relating to refrigeration or cooling capacity, all of which is readily complied with by employing multiple combinations of modules X and Y, or a substitute are transport means for module Y as shown as a complete mechanical refrigeration unit R is FIG. 9. In any case, separate columns of evaporative cooled air and sensibly cooled useable air are transported under low pressures through the modules X at right angles to each other; primary air transversely therethrough for evaporative cooling over the exterior of tubes 10, and secondary air longitudinally therethrough for sensible cooling within the interior of said tubes. In each instance the blower modules Y are to be used in transporting the air as clearly shown in FIG. 1.

Referring now to the plenum unit Z, separation of sensibly cooled air from the delivery end of an evaporator module X into two columns of air is provided for. This plenum unit can vary widely in design and configuration and requires in its broadest sense an inlet 40 and a pair of outlets 41 and 42. The plenum structure is shown as involving top and bottom panels 43 and 44 coplanar with the top and bottom panels of modules X and Y to establish imperforate continuations thereof, and imperforate side panels 45 that extend continuously between the side panels of said modules. In practice, the plenum is extended laterally beyond and coextensively over the intake side of the module X into which it delivers said proportion of sensibly cooled air. The function of inlet 40 is to receive the total sensibly cooled air delivered by an evaporator module X; the function of outlet 41 is to deliver a determined portion of said total sensibly cooled air into a second stage evaporator module X for subsequent sensible cooling; and the function of outlet 42 is to deliver a determined portion of said total sensibly cooled air into said second stage evaporator module X for subsequent evaporative cooling. The divisible portions of air delivered to outlets 41 and 42 can vary as circumstances require dependent upon volume and temperature drop requirements in each instance. For example, a plenum unit Z providing for substantial equal distribution is shown in FIG. 1 wherein the cross sectional area of outlet 42 represented by the dotted lines is 50 percent of the full cross sectional area of outlet 41 represented by dotted lines. Consequently, 50 percent of the total flow of sensibly cooled air represented by arrow a is diverted and discharged as evaporatively cooled air as represented by the arrow b. The primary air that is evaporatively cooled moves transversely through the modules X in each instance, and as represented by the arrow c is the first stage of cooling.

Referring now to compound cooler combinations shown as a typical embodiment in FIG. 1 of the drawings, there is a separate blower module Y provided for each individual cooling process represented by the arrows a, b and c. As shown, the blower modules Y are suction blowers which draw the proportionate columns of air as described, the sensibly cooled useful air being delivered from a blower module Y along arrow a, the divisible evaporative air being delivered from a blower module Y along arrow b, and the solely evaporative air being delivered from a blower module Y along arrow c.

The evaporatively cooled air is discharged to atmosphere in each instance. It will be seen that the staging or compounding of evaporative refrigeration utilizing sensibly cooled air can be repeated in order to achieve the temperature drop required in the sensibly cooled useful air delivered along the arrow a.

Referring now to FIG. 9 of the drawings, the mechanical refrigeration unit R is represented as a complete and operable commercially available unit, commonly designated as an "air conditioner." Such a unit R is normally electrically powered and involves a compressor, an expansion means and evaporator for heat absorption, and a condensor means for liquifying the refrigerant for recycling into the compressor etc. Unit R provides for the air transport required in the movement of sensibly cooled air through the tubes 10 of evaporator module X, which then cooperatively combines with the unit R as a pre-cooler. Again however, the blower module Y is employed to transport transverse evaporatively cooled air over the tubes 10. This combination provides for the economic feasibility of pre-cooling air conditioning condensors, so that the condensor preforms as though it were exposed to a lower ambient temperature day. For example, a 100° day would be reduced to an 85° day, and this allows the condensor to reject 30 percent to 50 percent more heat. Collectively, this innovation is proposed for incorporation throughout metropolitian areas, in which case the power stations would not see the effects of heat storm peak air conditioning demands, thus providing energy conservation calculated to reduce the temperature of make up air at the rate of about 1/10th the horse power presently required by mechanical refrigeration. This saving in electrical power would obviate the "brown and black out" problems. The electrical energy capacity previously held in reserve for heat storm periods can then be used productively for other purposes, new growth requirements, etc.

It will be apparent from the foregoing that a most practical and yet less expensive cooling is provided in which the evaporative medium is separated from the fluid being cooled, and that this process and apparatus made in accordance therewith is useful for purposes other than the cooling of air. Further, energy costs for lowering air temperature makes feasible the precooling of air conditioning condensors and the like, and to the end that there is a substantial conservation of energy. The panels of the evaporative module X are imperforate for the single height combinations shown, it being understood that multi-unit height combinations of modules X are made with open frame-like panel members 15 and/or 16; in this way establishing a single air column c-b subject to a blower means. Unobviously, there is an energy change in the primary evaporatively cooled air c-b, due to the absorption of heat from the sensible cooled air; and it is this semi-cooled air which is discharged separately and isolated from the sensibly cooled useful air.

Having described only typical preferred forms and applications of my invention, I do not wish to be limited or restricted to the specific details herein set forth, but wish to reserve to myself any modifications or variations that may appear to those skilled in the art: [I claim:]

What is claimed is:

1. A *rectangular* dry-air evaporative cooler [including] *module consisting essentially of:* a pair *only* of [spaced] *imperforate planar* side members [and a] *spaced by* ep core means *with a pair of opposite open sides thereof extending coextensively between said side members for angularly related movement of two separate columns of air, and with opposed end headers mounted to said side members perpendicular thereto, the core means* having opposite interfaces separating the spaces between said *side* ep members into two angularly related air passages with wetting means at one interface engaging a primary evaporative column of air and with the other interface engaging a secondary sensible cooled column of air with heat transfer between said opposite interfaces, [the remaining two pairs of opposite sides between said members being open therebetween for said angularly related movement of said separate columns of air, and both said separate columns of air being movable through said two angularly related passages coextensively between the spaced side members] *wherein the core means is comprised of a multiplicity of spaced parallel rigid and self-supporting tubes of plastic material mounted at their respective ends in said end headers and defining one of said angularly related air passages through the tubes and through the opposite end headers, said end headers extending coextensively between and spacing the side members at one pair of opposite sides of the core means, said end headers and side members defining the other one of said angularly related air passages over the tubes, said cooler module comprising means including said spaced, parallel, and self-supporting tubes of plastic material for obtaining substantially the same temperature decrease as a dry-air evaporative cooler module that is other wise the same in size, shape and operation as said rectangular dry-air evaporative cooler module and including metal tubes having substantially the same length, rigidity, spacing between them, air flow through them, air flow over them, and water flow over them, as said rectangular dry-air evaporative cooler module.*

2. The dry-air evaporative cooler as set forth in claim 1 wherein the pair of spaced side members are of square configuration and spaced dimensionally equal to said squareness.

[3. The dry-air evaporative cooler as set forth in claim 1 wherein the core means is comprised of a multiplicity of spaced parallel tubes extending between opposite end headers coextensively between said pair of spaced side members.]

4. The dry-air evaporative cooler as set forth in claim 1 [wherein the core means is comprised of a multiplicity of spaced parallel tubes extending between opposite end headers coextensively between said spaced members and] wherein the wetting means is at [the] *an* exterior interface of said tubes.

5. The dry-air evaporative cooler as set forth in claim 1 wherein the core means is comprised of spaced opposite end headers of resiliently [deformible] *deformable* material extending coextensively between said spaced members in and between which spaced parallel tubes are supported in friction fit openings.

6. The dry-air evaporative cooler as set forth in claim 1 wherein the core means is comprised of spaced opposite end headers of *resiliently deformable* elastomeric material extending coextensively between said spaced members in and between which spaced parallel tubes are supported in friction fit openings.

[7. The dry-air evaporative cooler as set forth in claim 1 wherein the core means is comprised of a multiplicity of spaced parallel tubes of plastic material extending between opposite end headers coextensively between said spaced members.]

[8. The dry-air evaporative cooler as set forth in claim 1, wherein the core means is comprised of a multiplicity of spaced parallel tubes of plastic material extending between opposite end headers coextensively between said spaced members, and wherein the wetting means is gauze wrapping at the exterior interfaces of said tubes.]

9. The dry-air evaporative cooler as set forth in claim 1, wherein the core means is comprised of opposite end headers of *resiliently deformable* elastomeric material extending coextensively between said spaced members in and between which spaced parallel tubes of plastic material are supported in friction fit openings, and wherein the wetting means is gauze wrapping at the exterior interfaces of said plastic tubes.

10. A dry-air evaporative cooler including: [an] *dry-air* evaporator module comprised of *two* spaced members and a core means having opposite interfaces separating the space between said members into two angularly related air passages with wetting means at one interface engaging a primary evaporative column of air and with the other interface engaging a secondary sensible cooled column of air with heat transfer between said opposite interfaces, *said core means comprising a multiplicity of spaced, parallel, rigid and self-supporting tubes of plastic material mounted at their ends in end headers mounted to said spaced members perpendicular thereto, said end headers defining one of said angularly related air passages through the tubes and through the opposite end headers, said cooler module comprising means including said spaced, parallel, rigid and self-supporting tubes of plastic material for producing substantially the same temperature decrease as a cooler module that is substantially the same in size, shape and operation as said dry-air evaporator modules, but including metal tubes having substantially the same length, rigidity, dimensions, spacing between them, air flow through them and over them, and water flow over them, as said dry-air evaporator module,* both said separate columns of air being [moveable] *movable* through said two angularly related passages coextensively between the said spaced members, and a pair of like blower modules and each comprising means drawing air through one of said angularly related air passages coextensively between said members.

11. The dry-air evaporative cooler combined of modules as set forth in claim 10, wherein the members are of rectangular configuration, and wherein the remaining two pairs of opposite sides between said members are open therebetween for said angularly related movement of said separate columns of air through said pair of like blower modules respectively.

12. The dry-air evaporative cooler combined of modules as set forth in claim 10, wherein the members are of square configuration and spaced dimensionally equal to said squareness, and wherein the remaining two pairs of opposite sides between said members are open therebetween for said angularly related movement of said separate columns of air through said pair of like blower modules respectively.

[13. The dry-air evaporative cooler combined of modules as set forth in claim 10, wherein the core means is comprised of a multiplicty of spaced parallel tubes extending between opposite end headers coextensively between said spaced members, wherein the members are of rectangular configuration, and wherein the remaining two pairs of opposite sides between said members are open therebetween for said angularly related movement of said separate columns of air through said pair of like blower modules respectively.]

14. The dry-air evaporative cooler combined of modules as set forth in claim 10, wherein the core means is comprised of a multiplicity of spaced parallel tubes extending between opposite end headers coextensively between said spaced members, wherein the members are of squared configuration and spaced dimensionally equal to said squareness, and wherein the remaining two pairs of opposite sides between said members are open therebetween for said angularly related movement of said separate columns of air through said pair of like blower modules respectively.

15. A compound dry-air evaporative cooler including: a pair of *dry-air evaporator modules and each comprised of two spaced members and* a core means having opposite interfaces *separating the space between said two spaced members into, and* establishing two air passages with wetting means at one interface engaging a primary evaporative column of air and with the other interface engaging a secondary sensible cooled column of air with heat transfer between said opposite interfaces, both said separate columns of air being [moveable] *movable* by blower means through said two angularly related passages, *said core means comprising a multiplicity of spaced, parallel, rigid and self-supporting tubes of plastic material mounted at their ends in end headers mounted to said spaced members perpendicular thereto, said end headers defining one of said angularly related air passages through the tubes and through the opposite end headers, said cooler module comprising means including said spaced, parallel, rigid and self-supporting tubes of plastic material for producing substantially the same temperature decrease as a cooler module that is substantially the same in size, shape and operation as said dry-air evaporator modules, but including metal tubes having substantially the same length, rigidity, dimensions, spacing between them, air flow through them and over them, and water flow over them, as said dry-air evaporator module,* and a diffuser means dividing the secondary sensible cooled column of air from one evaporator module and delivering separate primary and secondary columns of air through the respectively complementary passages therefor of the other evaporator module, thereby effecting a second stage of sensible cooling with cooled dry evaporative air.

16. The compound dry-air evaporator cooler as set forth in claim 15 wherein separate blower means moves the separate primary evaporative columns of air through each of the pair of evaporator modules respectively.

17. The compound dry-air evaporator cooler as set forth in claim 15, wherein separate blower means moves the secondary sensible cooled column of air through the pair of evaporator modules.

18. The compound of dry-air evaporator cooler as set forth in claim 15, wherein separate blower means moves the secondary sensible cooled column of air through the pair of evaporator modules, and wherein separate blower means moves the separate primary evaporative columns of air through each of the pair of evaporator modules respectively.

19. The compound dry-air evaporator cooler as set forth in claim 15 wherein the diffuser means comprises a full flow intake from said one evaporator module and a restrictive outlet into at least one passage of said other evaporator module.

20. A dry-air evaporator pre-cooler for mechanical refrigeration means, and including; a core means having opposite interfaces establishing two air passages with wetting means at one interface engaging a primary evaporative column of air and with the other interface engaging a secondary sensible cooled column of air with heat transfer between said opposite interfaces, blower means moving the primary evaporative column of air through said passage therefor, and the mechanical refrigeration means having a condenser and an air blower means with an intake drawing the secondary sensible cooled column of air through said condenser from the pasage therefor, whereby said mechanical refrigeration condensor operates with sensible cooled air at a substantially reduced intake temperature.

21. The dry-air evaporative pre-cooler as set forth in claim 20 wherein the intake drawing of the secondary sensible cooled column of air through the pre-cooler passage therefor is directed through heat absorption means of said mechanical refrigeration means.

22. The dry-air evaporative pre-cooler as set forth in claim 20 wherein the intake drawing of the secondary sensible cooled column of air through the pre-cooler passage therefor is directed through sensible cooling means of said mechanical refrigeration means.

23. The dry-air evaporative pre-cooler as set forth in claim 20 wherein the intake drawing of the secondary sensible cooled column of air through the pre-cooler passage therefor is directed through both the sensible cooling means and said heat absorption means of said mechanical refrigeration means.

*24. The dry-air evaporative cooler as set forth in claim 1. wherein the wetting means is gauze wrapping at the exterior interfaces of said tubes.*

*25. The dry-air evaporative cooler as set forth in claim 1 in which said tubes have on the order of 1/16 inch all thickness.*

*26. The dry-air evaporative cooler of claim 1 in which said tubes extend between rectangular frame members which are entirely open to said primary evaporative column of air on opposite sides of said tubes in a direction normal to said tubes.*

*27. The dry-air evaporative cooler of claim 10 in which said tubes extend between rectangular frame members which are entirely open to said primary evaporative column of air on opposite sides of said tubes in a direction normal to said tubes, whereby said modules are adapted to be placed side-by-side for form multi-*unit height.

*28. The dry-air evaporative cooler of claim 20 in which each of said core means is comprised of a multiplicity of spaced parallel tubes extending between opposite end headers, coextensively between said pair of spaced side members, the exterior of said tubes forming said one interface and the interior of said tubes forming said other interface.*

*29. The dry-air evaporative cooler of claim 28 in which said tubes are self-supporting plastic pipes.*

*30. The dry-air evaporative cooler as set forth in claim 1 further comprising means for passing said primary evaporative column of air over said wetting means, and means for passing said secondary sensible cooled column of air through said tubes of plastic material.*

*31. The dry-air evaporative cooler as set forth in claim 33 further comprising means for passing sensibly cooled air from said dry-*air evaporative cooler over tubes of plastic material in at least one additional dry-*air evaporative cooler.*

* * * * *